United States Patent
Ratasuk et al.

(10) Patent No.: US 10,165,624 B2
(45) Date of Patent: *Dec. 25, 2018

(54) METHOD AND SYSTEM FOR OPERATING COVERAGE-LIMITED DEVICES

(71) Applicant: NOKIA SOLUTIONS AND NETWORKS OY, Espoo (FI)

(72) Inventors: Rapeepat Ratasuk, Hoffman Estates, IL (US); Jun Tan, Lake Zurich, IL (US); Weidong Yang, Hoffman Estates, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 32 days.

This patent is subject to a terminal disclaimer.

(21) Appl. No.: 14/745,003

(22) Filed: Jun. 19, 2015

(65) Prior Publication Data

US 2015/0289315 A1    Oct. 8, 2015

Related U.S. Application Data

(63) Continuation of application No. 13/939,092, filed on Jul. 10, 2013, now Pat. No. 9,089,001.

(51) Int. Cl.
*H04W 88/10* (2009.01)
*H04W 48/12* (2009.01)
*H04W 52/02* (2009.01)
*H04W 4/06* (2009.01)
(Continued)

(52) U.S. Cl.
CPC ............ *H04W 88/10* (2013.01); *H04L 12/18* (2013.01); *H04W 4/06* (2013.01); *H04W 4/70* (2018.02); *H04W 48/12* (2013.01); *H04W 52/0216* (2013.01); *H04W 52/0219* (2013.01);
(Continued)

(58) Field of Classification Search
None
See application file for complete search history.

(56) References Cited

U.S. PATENT DOCUMENTS 9,089,001 B2 * 7/2015 Ratasuk ............... H04W 88/10
2002/0177445 A1 * 11/2002 Hans ................. H04M 15/8044
455/446
2008/0278387 A1    11/2008 Piole et al.
(Continued)

FOREIGN PATENT DOCUMENTS

EP    2 385 714 A2    11/2011

OTHER PUBLICATIONS

International Search Report and Written Opinion dated Oct. 8, 2014, for corresponding International Patent Application No. PCT/EP2014/062174. (No copy provided, per MPEP 609, Copy submitted in parent U.S. Appl. No. 13/939,092).
S2-110673; InterDigital Communications; "Triggering a detached MTC device"; 3GPP TSG SA WG2 Meeting #83; Feb. 21-25, 2011, Salt Lake City, Utah, USA, 4 pages. (No copy provided, per MPEP 609, Copy submitted in parent U.S. Appl. No. 13/939,092).
(Continued)

*Primary Examiner* — Donald L Mills
(74) *Attorney, Agent, or Firm* — Squire Patton Boggs (US) LLP

(57) ABSTRACT

A method and apparatus can be configured to operate a node in a first mode to support one or more user equipment. The method can also include operating the node in a second mode to support one or more user equipment. The coverage of the second mode is enhanced compared to the coverage of the first mode. The method can also include broadcasting information about when the second mode is available.

25 Claims, 6 Drawing Sheets

| Channel | | MCL (dB) | | Required Transmission Time (ms) |
|---|---|---|---|---|
| | | FDD (2Tx2Rx at eNB) | Improvement Needed (dB) | |
| UL | PUCCH (1a) | 147.2 | 13.5 (-21.3 dB) | 50 |
| | PRACH | 141.7 | 19.0 (-29.0 dB) | 400 |
| | PUSCH (TBS=16 bits) | 140.7 | 20.0 (-24.3 dB) | 200 |
| DL | PDSCH (TBS=152 bits) | 145.4 | 15.3 (-19.3 dB) | 80 |
| | PBCH | 149.0 | 11.7 (-19.3 dB) | 160 |
| | PDCCH (1A) | 146.1 | 14.6 (-19.3 dB) | 200 (4 CCEs) |

(51) Int. Cl.
*H04L 12/18* (2006.01)
*H04W 4/70* (2018.01)

(52) U.S. Cl.
CPC .......... *Y02D 70/00* (2018.01); *Y02D 70/1262* (2018.01); *Y02D 70/21* (2018.01)

(56) References Cited

U.S. PATENT DOCUMENTS

| | | | |
|---|---|---|---|
| 2009/0111499 A1 | 4/2009 | Bosch et al. | |
| 2010/0246462 A1 | 9/2010 | Lindgren et al. | |
| 2013/0003591 A1* | 1/2013 | Novak | H04W 36/06 370/252 |
| 2013/0258938 A1* | 10/2013 | Sagfors | H04W 72/02 370/312 |
| 2014/0198772 A1* | 7/2014 | Baldemair | H04L 27/2655 370/335 |
| 2015/0092566 A1* | 4/2015 | Balachandran | H04W 8/22 370/242 |
| 2015/0271763 A1* | 9/2015 | Balachandran | H04W 52/245 370/338 |

OTHER PUBLICATIONS

R1-132299; Nokia Siemens Networks, Nokia; "Conclusions from Coverage Enhancement Study for MTC"; 3GPP TSG RAN1#73; Fukuoka, Japan, May 20-24, 2013, 4 pages. (No copy provided, per MPEP 609, Copy submitted in parent U.S. Appl. No. 13/939,092).
R1-130218; MediaTek Inc.; "On Required System Functionalities for MTC UEs Operating in Enhanced Coverage Mode"; 3GPP TSG RAN WG1 Meeting #72; St Julian's, Malta, Jan. 28-Feb. 1, 2013, 6 pages. (No copy provided, per MPEP 609, Copy submitted in parent U.S. Appl. No. 13/939,092).
3GPP TR 36.888 V12.0.0 (Jun. 2013); 3rd Generation Partnership Project; Technical Specification Group Radio Access Network; Study on provision of low-cost Machine-Type Communications (MTC) User Equipments (UEs) based on LTE (Release 12), 55 pages. (No copy provided, per MPEP 609, Copy submitted in parent U.S. Appl. No. 13/939,092).
Indonesian Office Action corresponding to Application No. P00201600123, dated Sep. 24, 2018.

* cited by examiner

| Channel | | MCL (dB) | | Required Transmission Time (ms) |
|---|---|---|---|---|
| | | FDD (2Tx/2Rx at eNB) | Improvement Needed (dB) | |
| UL | PUCCH (1a) | 147.2 | 13.5 (-21.3 dB) | 50 |
| | PRACH | 141.7 | 19.0 (-29.0 dB) | 400 |
| | PUSCH (TBS=16 bits) | 140.7 | 20.0 (-24.3 dB) | 200 |
| DL | PDSCH (TBS=152 bits) | 145.4 | 15.3 (-19.3 dB) | 80 |
| | PBCH | 149.0 | 11.7 (-19.3 dB) | 160 |
| | PDCCH (1A) | 146.1 | 14.6 (-19.3 dB) | 200 (4 CCEs) |

Fig. 1

Accessing a node via coverage-limited user equipment — 310

Fig. 3

METHOD AND SYSTEM FOR OPERATING COVERAGE-LIMITED DEVICES

CROSS REFERENCE TO RELATED APPLICATION

The present application is a 37 C.F.R. § 1.53(b) continuation of co-pending U.S. patent application Ser. No. 13/939,092 filed Jul. 10, 2013, the entire contents of which are hereby incorporated by reference.

BACKGROUND

Field

Embodiments are directed to a method and a system for operating one or more coverage-limited devices to reduce overhead and latency.

Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method can comprise operating a node in a first mode to support one or more user equipment. The method can also include operating the node in a second mode to support one or more user equipment. The coverage of the second mode is enhanced compared to the coverage of the first mode. The method can also include broadcasting information about when the second mode is available.

In the method of the first embodiment, the one or more user equipment requiring enhanced coverage is controlled to access the node when the node is operating in the second mode In the method of the first embodiment, the method can further comprise broadcasting information about when the second mode is available.

In the method of the first embodiment, the operating the node in the second mode comprises operating the node in the second mode at a specified time.

In the method of the first embodiment, the specified time corresponds to a low-traffic/quiet time.

In the method of the first embodiment, the broadcasting information comprises broadcasting the information periodically to inform one or more coverage-limited user equipment that the second mode is available so that the one or more coverage-limited user equipment can access the node.

In the method of the first embodiment, the one or more coverage-limited user equipment are machine-type communications devices.

In the method of the first embodiment, the broadcasting information about when the second mode is available comprises broadcasting information through a physical broadcast channel.

In the method of the first embodiment, operating the node in the second mode comprises operating the second mode during one or more periods, and a same system configuration is maintained across said one or more periods of operating in the second mode.

In the method of the first embodiment, operating the node in the second mode comprises operating the second mode during one or more periods, and a same user configuration is maintained across said one or more periods of operating in the second mode.

In the method of the first embodiment, the one or more coverage-limited user equipment are programmed to access the node during the second mode.

In the method of the first embodiment, operating the node in the second mode comprises enabling coverage extension modes on channels.

According to the second embodiment, an apparatus can comprise at least one processor. The apparatus can also include at least one memory including computer program code. The at least one memory and the computer program code can be configured, with the at least one processor, to cause the apparatus at least to operate in a first mode to support one or more user equipment. The apparatus can also operate in a second mode to support one or more user equipment. The coverage of the second mode is enhanced compared to the coverage of the first mode. The apparatus may also be caused to broadcast information about when the second mode is available.

In the apparatus of the second embodiment, the one or more user equipment requiring enhanced coverage is controlled to access the apparatus when the apparatus is operating in the second mode.

In the apparatus of the second embodiment, the apparatus can be further caused to broadcast information about when the second mode is available.

In the apparatus of the second embodiment, the operating in the second mode comprises operating in the second mode at a specified time.

In the apparatus of the second embodiment, the specified time corresponds to a low-traffic/quiet time.

In the apparatus of the second embodiment, the broadcasting information comprises broadcasting the information periodically to inform one or more coverage-limited user equipment that the second mode is available so that the one or more coverage-limited user equipment can access the apparatus.

In the apparatus of the second embodiment, the one or more coverage-limited user equipment are machine-type communications devices.

In the apparatus of the second embodiment, the broadcasting information about when the second mode is available comprises broadcasting information through a physical broadcast channel.

In the apparatus of the second embodiment, operating in the second mode comprises operating the second mode during one or more periods, and a same system configuration is maintained across said one or more periods of operating in the second mode.

In the apparatus of the second embodiment, operating the node in the second mode comprises operating the second mode during one or more periods, and a same user configuration is maintained across said one or more periods of operating in the second mode.

In the apparatus of the second embodiment, the one or more coverage-limited user equipment are programmed to access the node during the second mode.

In the apparatus of the second embodiment, operating the node in the second mode comprises enabling coverage extension modes on channels.

According to a third embodiment, a computer program product can be embodied on a non-transitory computer readable medium. The computer program product can be configured to control a processor to perform a process comprising operating a node in a first mode to support one or more user equipment. The process can also include operating the node in a second mode to support one or more user equipment. The coverage of the second mode is enhanced compared to the coverage of the first mode. The process may also include broadcasting information about when the second mode is available.

According to a fourth embodiment, a method can comprise accessing, via one or more coverage-limited user equipment, a node. The node can be operated in a first mode to support one or more user equipment. The node can be operated in a second mode to support one or more user equipment. The coverage of the second mode can be enhanced compared to the coverage of the first mode. The node broadcasts information about when the second mode is available. The node can be accessed by the one or more coverage-limited user equipment while the node is operated in the second mode.

In the method of the fourth embodiment, accessing the node comprises accessing the node with one or more coverage-limited user equipment that uses a streamlined procedure if the one or more coverage-limited user equipment has previously accessed the node.

BRIEF DESCRIPTION OF THE DRAWINGS

For proper understanding of the invention, reference should be made to the accompanying drawings, wherein:

FIG. 1 illustrates transmission times for reaching cell-edge UEs according to embodiments of the invention.

FIG. 3 illustrates a logic flow diagram of a method according to certain embodiments of the invention.

DETAILED DESCRIPTION

Figure 2:
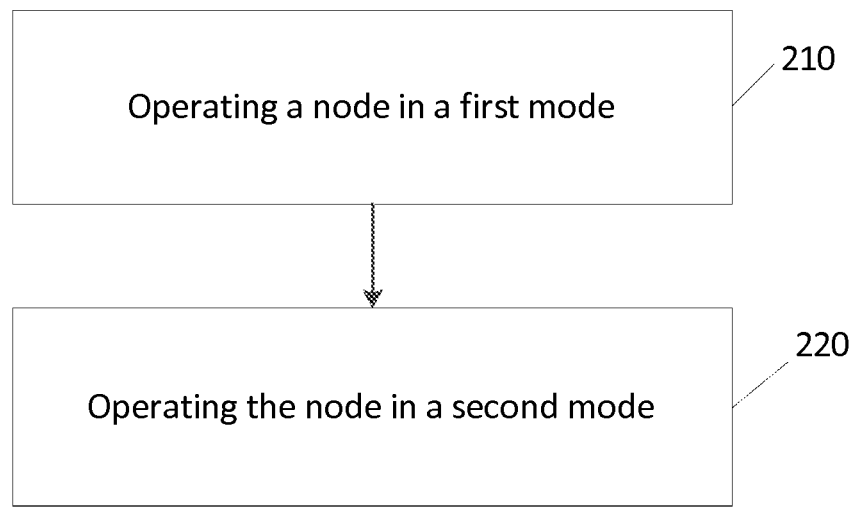
FIG. 2 illustrates a logic flow diagram of a method according to certain embodiments of the invention.

Certain embodiments of the present invention relate to a method and a system for operating coverage-limited devices to reduce overhead and latency.

In Long Term Evolution (LTE) Release-12, coverage enhancement for Machine Type Communications (MTC) is being studied with the goal of extending LTE coverage approximately 20 dB beyond the typical range of LTE (the typical range being a range with a cell-edge data rate of 20 kbps, as described in the LTE Release 12 study item). Extending LTE coverage is meant to allow LTE to be used for services such as smart metering, where the meters may be installed in basements or shielded locations, and thus may be subject to substantial penetration loss. MTC devices may be programmed to send data at a specific time (such as late at night, for example).

The target data rate for these types of services is generally low. An example given in the study item is a transmission size of the order of 100 bytes/message in the uplink and 20 bytes/message in the downlink, and which allows a latency of up to 10 seconds for downlink and up to 1 hour for uplink.

In order to support the above-described coverage enhancement, longer transmission times may be needed. Longer transmission times can be achieved, for example, by using Transmission Time Interval (TTI) bundling, repetition or spreading. Other techniques that can also be used for coverage enhancement include retransmission, increased transmission power, power boosting, and low-rate coding.

FIG. 1 illustrates transmission times for reaching cell-edge UEs according to embodiments of the invention. In some cases, the time (or the repetition factor) can be configurable based on shortfalls of the UEs. However, for common channels like the Physical Broadcast Channel (PBCH) and the Physical Random Access Channel (PRACH), the amount of overhead can be fixed to an amount required by cell-edge UEs. Other broadcast information such as information corresponding to System Information Blocks (SIBs) and information sent through paging must also be able to reach cell-edge UEs.

FIG. 1 illustrates that the overhead to operate the system for coverage-limited MTC devices can be significant. For instance, 200 ms of Physical Uplink Shared Channel (PUSCH) transmission can be required to transmit 16 information bits per resource block. For the Physical Downlink Control Channel (PDCCH), using an aggregation level of 4 and 200 repetitions, 800 Control Channel Elements (CCEs) will be taken by one single device for a single transmission. This may be seen as 400 missed scheduling opportunities assuming an average CCE aggregation level of 2.

Two different types of overhead can be considered: (1) system-specific parameter broadcasts (broadcasts through Master Information Blocks (MIB), SIBs, paging, etc.) and random access (via PRACH), and (2) connection establishment (connection establishment through random access procedures, and Radio Resource Configuration (RRC), for example). The first type of overhead can be present regardless of the number of MTC devices. The second type of overhead can be incurred each time an idle device connects to the network and establishes a data connection. For certain services (such as a smart-meter type of service), the overhead associated with establishing a data connection may be significantly more than the amount of data to be transmitted.

In view of the above, embodiments of the present invention are directed to a method for system configuration and deployment that can reduce overhead and latency.

To reduce the overhead and latency, the following methods are proposed. For implementation-specific methods, a coverage-extension mode can be designated for the system at a specified time (such as during a low-traffic/quiet period in the middle of the evening, for example). In one embodiment, the system can be put in coverage-extension mode only at the specified time. Coverage-limited MTC UEs can be time-controlled to access the system during the period. In one embodiment the coverage-limited UEs can be time-controlled to access the system only in that period. To minimize the amount of system information needed to be read by the UEs, the system can use a same configuration across different periods of the coverage-extension mode. MTC UEs accessing the system may be able to operate with reading less information. For example, MTC UEs accessing the system may only have to read one System Information Block (such as SIB1), which can reduce their access time latency significantly.

MTC UEs that have not previously connected to the system can follow a normal procedure. The normal procedures can generally refer to the procedures of the previous approaches that are used by UEs to connect to the system. In contrast with the previous approaches, certain embodiments of the present invention are directed to a streamlined procedure for coverage-limited UEs that have accessed the system before. In this streamlined procedure, the UEs can skip at least one of the steps that would normally be required. UEs that have previously connected to the system can follow a different procedure as outlined below.

For UEs that have previously connected to the system, they may follow a different streamlined procedure. In LTE, a UE that has gone into disconnected or idle state will generally not maintain its Radio Resource Control (RRC) configuration. When the UE connects to the system again, the eNB will performance RRC configuration and transmit this configuration to the UE. In the modified access procedure, the UE can maintain its Radio Resource Control (RRC) configuration from the last access attempts unless otherwise informed by the eNode B (eNB). This allows the network to skip the RRC configuration/establishment stage for the UE. Alternatively, the network may have certain predefined configurations and may assign the UE one of these configurations. These configurations may be conveyed to the UE at initial access, and in subsequent access attempts only a configuration index is required to be transmitted to the UE. Further, if the UE is fixed (i.e., not moving), the UE can skip a random access procedure, as described in further detail below. The UE can instead use other means, e.g., a Scheduling Request (SR) to notify the network that the UE has come on-line.

Furthermore, the configuration index mentioned above can be conveyed in a number of ways: in the first way, it is conveyed as part of system information broadcast; in the second way it is conveyed in a new physical signal at a frequency location and time predefined by the cell or network (e.g. the new signal takes the form of a pseudo-random sequence such as M-sequence, Gold sequence, Kasami sequence, and the configuration index is embedded in the sequence's initial state), which makes it easier for UEs to identify the configuration index.

With regard to skipping the random access procedure, to access the system, the UE generally: (1) reads system information blocks to find out about the system, (2) performs a random access procedure to let an eNode B know that the UE is trying to access the system, and (3) is configured by the eNode B (eNB) for system access.

A random access procedure includes sending a preamble on the Physical Random Access Channel (PRACH) by the UE, waiting for a response by the eNB, and letting the eNB know who the UE is and why the UE is assessing the system. Another important part of the random access procedure is to get timing information from the eNB. In LTE, because uplink transmissions from UEs are generally synchronized, the UEs may require this timing information (called timing advance). Timing advance values change as a UE moves.

For fixed UEs, these UEs do not require receiving timing advance again (because the timing advance is the same as before). As such, these fixed UEs can skip the entire random access procedure, if a different procedure can be used to tell the eNode B that a fixed UE has come on-line.

Because, in certain embodiments of the present invention, a UE keeps the same RRC configuration, the UE may not need this information again. If the UE is fixed, then the UE does not need timing advance from a random access procedure. As such, in certain embodiments, the UE can skip the random access procedure.

With regard to new network features, cell-specific or system-specific broadcast information can be used to let coverage-limited MTC UEs know when they can access the system. In one example, this broadcast information can indicate when UEs with certain pathloss, Received Signal Received Power (RSRP), or Signal to Interference plus Noise Ratio (SINR) can access the system (the broadcast information can indicate that UEs with pathloss greater than 140 dB can assess the system from 1-2 AM, for example). Alternatively, this broadcast information can simply state when coverage-limited UEs that cannot access the system currently (UEs that are unable to decode the MIB/SIBs, unable to complete random access procedure, unable to decode the control channel, etc.) will be able to access the system. Alternatively, this broadcast information can simply state if coverage-limited UEs can access the system at the present time (for example, a flag can be used to indicate whether the system is in coverage-extension mode).

To efficiently support coverage extension for MTC devices, certain embodiments can use a coverage-extension mode at a specified time (e.g., during quiet period in the middle of the night), as described above. Coverage-limited MTC UEs can be time-controlled to access the system only during that period.

As such, new channels or repetitions can be used to provide coverage that is supported at certain times. In one embodiment, new channels or repetitions can be needed to provide coverage that are only supported at certain times. This can include, for example, supporting coverage enhancement features at certain times. As described above, UEs that do not require coverage enhancement can access the system at any time.

In one embodiment, cell-specific or system-specific information about the coverage-extended mode can be broadcasted periodically (broadcasted once per minute or once per hour, for example) for the purpose of informing new coverage-limited UEs of the access time. This feature can be directed at supporting coverage-limited UEs that are accessing the system for the first time (such as meters that have just been installed) or UEs that operate in conjunction with a network has undergone a reconfiguration. In this mode, the network can broadcast a limited amount of information in a coverage-extended mode (e.g., the information can be broadcasted through a modified Physical Broadcast Channel (PBCH), for example) to tell the UEs when they can access the system. Without this support, the UEs may continuously try to access the system, which can deplete the power of battery-powered UEs. Alternately, information about the coverage-extended mode may be directly programmed into the UEs, or specified via the standards.

In another embodiment, if the MTC coverage-limited UE cannot detect the broadcasted information of the coverage extension mode of the network, the UE will try to access the network for a limited number of times, or wait for a long period of time for another detecting attempt for the broadcasting of information. Alternatively, in one embodiment, a certain type of low-cost MTC can only operate under the coverage-extension mode.

In another embodiment, the system can use a same configuration across periods during the coverage-extension mode. This can include, for example, the same Physical-Random-Access-Channel/Physical-Uplink-Control-Channel (PRACH/PUCCH) configurations, cell-specific values (such as access class barings), cell reselection parameters, etc. The system can also use a same value (such as a "systemInfoValueTag" value, for example) so that MTC UEs accessing the system will read less information (such as only having to read System Information Block SIB1), which can reduce their access time latency significantly.

Because the UEs might attempt to re-read the SIBs and may not retain the information from the previous access, standards changes may be required in these circumstances. Of course, a bitmap can be also used to indicate which SIB messages have changed since the last time the UE accessed the system, so a piece-wise update/information acquisition is possible. In this case, a common timing reference for the eNB and the coverage-extension-mode UEs may need to be established so that a "last time" is well defined.

In another embodiment, the system can pre-allocate or reserve resources such as a PRACH preamble, a PUCCH resource index, and/or a Radio Network Temporary Identity (RNTI) in a time-division multiplexed manner. For example, a PUCCH resource index can be assigned to a first UE for a specific time, and then to a second UE, and so on.

In another embodiment, MTC UEs that have not previously connected to the system before can follow an existing access procedure. UEs that have previously connected to the system can follow a different procedure as outlined below. In another embodiment, a field can be broadcasted to inform previously-connected UEs to follow the existing access procedure.

With regard to the UE connection procedure for previously-connected UEs, the UE can maintain its RRC configuration from the last access attempts unless otherwise informed by the eNB. As described above, this allows the network to skip the RRC configuration/establishment stage for the UE. As such, the UE can maintain all parameters needed for data communication from its previous connection. To simplify this implementation on the network side, the network may have certain configurations predefined and may assign the UEs one of these configurations. Alternatively, the network may inform the UE of the various predefined configurations, and then signal only the index to the UE. If the UE is fixed (i.e., the UE is not moving), the UE can skip a random access procedure. As described above, the UE can instead use other means, e.g., an SR to notify the network that the UE has come on-line. In this case, the UE will already have the timing advance information needed for uplink transmission. Furthermore, if MTC operation can be time-controlled tightly, the network may also know when each UE will access the system (because data transmission is periodic and known), so resources can be preconfigured as well. If the UE cannot establish communication with the eNB with the new procedure after repeated attempts, the UE can fall back to the normal connection procedure.

In another embodiment, coverage-enhancement features (e.g., such as Transmission Time Interval (TTI) bundling) and coverage-enhancement channels (e.g., a Modified-Physical-Broadcast-Channel (M-PBCH)) are turned on only at specific times. Alternatively, specific parameters of coverage enhancement features (e.g., TTI bundling greater than 4) are turned on only at specific times.

In another embodiment, MTC UEs can be configured or programmed to access the system at specific times based on channel quality measurements (e.g., a Reference Signal Receive Power (RSRP)). For example, a UE with an RSRP greater than a threshold can access the system at any time, while a UE with an RSRP below a threshold can access the system only for a certain time (such as from 1-2 AM, for example). Several threshold values may be used. Similarly, MTC UEs may be configured or programmed to access the system at specific times based on their service level or traffic pattern.

FIG. 2 illustrates a logic flow diagram of a method according to certain embodiments of the invention. The method illustrated in FIG. 2 includes, at 210, operating a node in a first mode to support one or more user equipment. The method also includes, at 220, operating the node in a second mode to support one or more user equipment. The coverage of the second mode is enhanced compared to the coverage of the first mode.

FIG. 3 illustrates a logic flow diagram of a method according to certain embodiments of the invention. The method illustrated in FIG. 3 includes, at 310, accessing, via coverage-limited user equipment, a node. The node can be operated in a first mode to support one or more user equipment. The node can be operated in a second mode to support one or more user equipment. The coverage of the second mode can be enhanced compared to the coverage of the first mode. The node can be accessed by the coverage-limited user equipment while the node is operated in the second mode.

Figure 4:
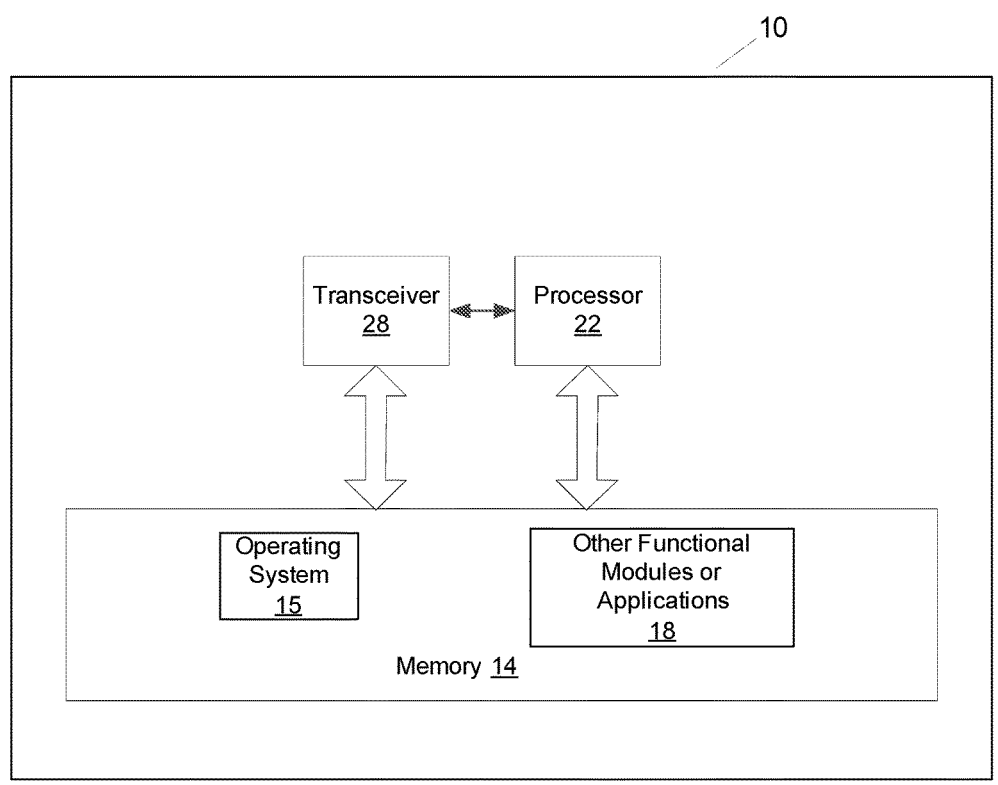
FIG. 4 illustrates an apparatus according to embodiments of the invention.

FIG. 4 illustrates an apparatus 10 according to embodiments of the invention. Apparatus 10 can be a transmitting device, such as a base station and/or an eNode B, for example. In other embodiments, apparatus 10 can be a user equipment, for example.

Apparatus 10 can include a processor 22 for processing information and executing instructions or operations. Processor 22 can be any type of general or specific purpose processor. While a single processor 22 is shown in FIG. 4, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In certain embodiments, memory 14 stores software modules that provide functionality when executed by processor 22. The modules can include an operating system 15 that provides operating system functionality for apparatus 10.

The memory can also store one or more functional modules 18, such as an application or program, to provide additional functionality for apparatus 10. The components of apparatus 10 can be implemented in hardware, or as any suitable combination of hardware and software.

Figure 5:
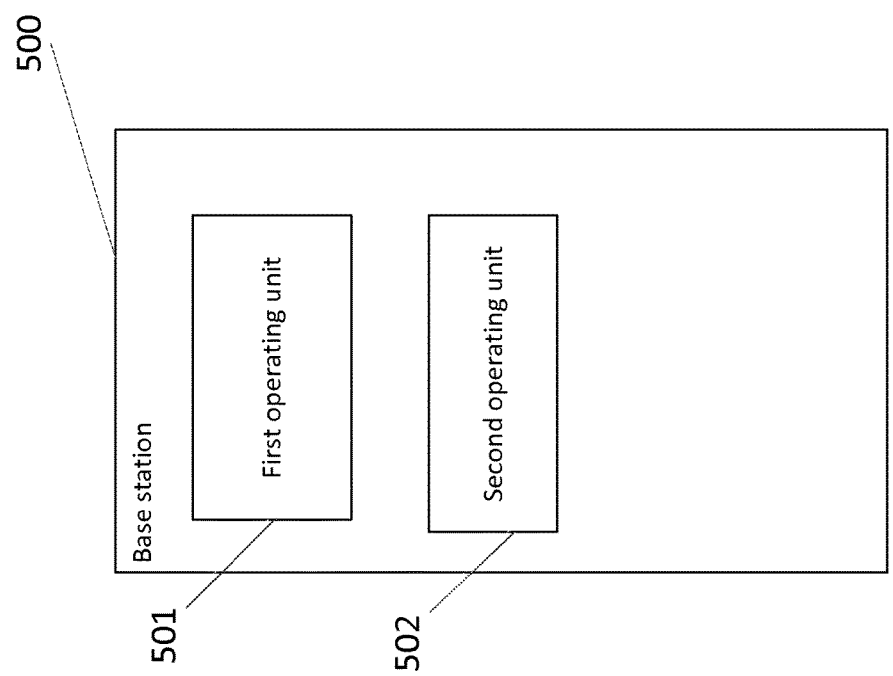
FIG. 5 illustrates an apparatus according to other embodiments of the invention.

FIG. 5 illustrates an apparatus 500 according to other embodiments of the invention. Apparatus 500 can be, for example, a base station and/or an eNode B. Apparatus 500 can include a first operating unit 501 for operating the apparatus 500 in a first mode to support one or more user equipment. Apparatus 500 can also include a second operating unit 502 for operating apparatus 500 in a second mode to support one or more user equipment. The coverage of the second mode is enhanced compared to the coverage of the first mode.

Figure 6:
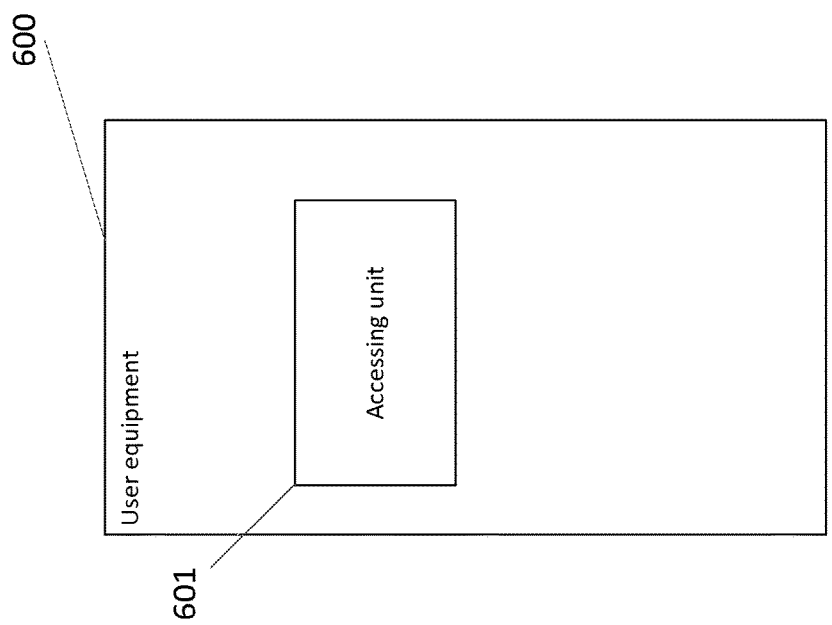
FIG. 6 illustrates an apparatus according to other embodiments of the invention.

FIG. 6 illustrates an apparatus 600 according to other embodiments of the invention. Apparatus 600 can be, for example, a user equipment. Apparatus 600 can include an accessing unit 601 that accesses a node. The node can be operated in a first mode to support one or more user equipment. The node can be operated in a second mode to support one or more user equipment. The coverage of the second mode can be enhanced compared to the coverage of the first mode. The node can be accessed by the coverage-limited user equipment while the node is operated in the second mode.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
operating a node in a first mode to support one or more user equipment;
operating the node in a second mode to support one or more user equipment, wherein the coverage of the second mode is enhanced compared to the coverage of the first mode; and
broadcasting information about when the second mode is available, wherein the information is comprised in a field within a system information block (SIB) and the information indicates a threshold for received signal level,
wherein the one or more user equipment experiencing received signal level that fulfills a predetermined criterion with respect to the threshold is controlled based upon the broadcast information to access the node when the node is operating in the second mode.

2. The method according to claim 1, wherein the operating the node in the second mode comprises operating the node in the second mode at a specified time.

3. The method according to claim 2, wherein the specified time corresponds to a low-traffic/quiet time.

4. The method according to claim 1, wherein the broadcasting information comprises broadcasting the information periodically to inform one or more machine-type communications devices that the second mode is available so that the one or more machine-type communications devices can access the node.

5. The method according to claim 4, wherein the one or more machine-type communications devices are programmed to access the node during the second mode.

6. The method according to claim 1, wherein the broadcasting information about when the second mode is available comprises broadcasting information through a physical broadcast channel.

7. The method according to claim 1, wherein operating the node in the second mode comprises operating the second mode during one or more periods, and a same system configuration is maintained across said one or more periods of operating in the second mode.

8. The method according to claim 1, wherein operating the node in the second mode comprises operating the second mode during one or more periods, and a same user configuration is maintained across said one or more periods of operating in the second mode.

9. The method according to claim 1, wherein operating the node in the second mode comprises enabling one or more coverage extension modes on one or more channels.

10. An apparatus, comprising:
at least one processor; and
at least one memory including computer program code,
the at least one memory and the computer program code configured, with the at least one processor, to cause the apparatus at least to:
operate in a first mode to support one or more user equipment;
operate in a second mode to support one or more user equipment, wherein the coverage of the second mode is enhanced compared to the coverage of the first mode; and
broadcast information about when the second mode is available, wherein the information is comprised in a field within a system information block (SIB) and the information indicates a threshold for received signal level,
wherein the one or more user equipment experiencing received signal level that fulfills a predetermined criterion with respect to the threshold is controlled based upon the broadcast information to access the apparatus when the apparatus is operating in the second mode.

11. The apparatus according to claim 10, wherein the operating in the second mode comprises operating in the second mode at a specified time.

12. The apparatus according to claim 11, wherein the specified time corresponds to a low-traffic/quiet time.

13. The apparatus according to claim 10, wherein the broadcasting information comprises broadcasting the information periodically to inform one or more machine-type communications devices that the second mode is available so that the one or more machine-type communications devices can access the apparatus.

14. The apparatus according to claim 13, wherein the one or more machine-type communications devices are programmed to access the node during the second mode.

15. The apparatus according to claim 10, wherein the broadcasting information about when the second mode is available comprises broadcasting information through a physical broadcast channel.

16. The apparatus according to claim 10, wherein operating in the second mode comprises operating the second mode during one or more periods, and a same system configuration is maintained across said one or more periods of operating in the second mode.

17. The apparatus according to claim 10, wherein operating the node in the second mode comprises operating the second mode during one or more periods, and a same user configuration is maintained across said one or more periods of operating in the second mode.

18. The apparatus according to claim 10, wherein operating the node in the second mode comprises enabling one or more coverage extension modes on one or more channels.

19. The apparatus according to claim 10, wherein the field within the SIB is a flag.

20. The apparatus according to claim 10, wherein the criterion requires experiencing received signal level below −140 dB.

21. A computer program product, embodied on a non-transitory computer readable medium, the computer program product configured to control a processor to perform a process, comprising:
operating a node in a first mode to support one or more user equipment;
operating the node in a second mode to support one or more user equipment, wherein the coverage of the second mode is enhanced compared to the coverage of the first mode; and
broadcasting information about when the second mode is available, wherein the information is comprised in a field within a system information block (SIB) and the information indicates a threshold for received signal level,
wherein the one or more user equipment experiencing received signal level that fulfills a predetermined criterion with respect to the threshold is controlled based upon the broadcast information to access the node when the node is operating in the second mode.

22. An apparatus, comprising:
at least one processor; and
at least one memory including computer program code,
the at least one memory and the computer program code configured, with the at least one processor, to cause an apparatus at least to:
receive broadcast information from a node as part of a system information block (SIB), wherein the information is comprised in a field within the SIB and the information indicates a threshold for received signal level, wherein the node is operated in a first mode to support one or more user equipment, the node is operated in a second mode to support one or more user equipment, the coverage of the second mode is enhanced compared to the coverage of the first mode, and wherein the broadcast information is about when the second mode is available; and
access the node while the node is operated in the second mode,
wherein the apparatus experiencing received signal level that fulfills a predetermined criterion with respect to the threshold is controlled based upon the broadcast information to access the node when the node is operating in the second mode.

23. The apparatus of claim 22, wherein accessing the node comprises accessing the node with one or more machine-type communications devices that use a streamlined procedure upon detecting that the one or more machine-type communications devices has previously accessed the node, wherein the streamlined procedure comprises the apparatus applying a stored radio resource control (RRC) configuration for the current access attempt, wherein the RRC configuration has been stored from the previous access attempts.

24. The apparatus according to claim 22, wherein the field within the SIB is a flag.

25. The apparatus according to claim 22, wherein the criterion requires experiencing received signal level below −140 dB.

* * * * *